(12) United States Patent
Tenny et al.

(10) Patent No.: US 11,856,396 B2
(45) Date of Patent: *Dec. 26, 2023

(54) SYSTEM AND METHOD FOR SECURITY ACTIVATION WITH SESSION GRANULARITY

(71) Applicant: Futurewei Technologies, Inc., Plano, TX (US)

(72) Inventors: Nathan Edward Tenny, Poway, CA (US); Yi Guo, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/475,806

(22) Filed: Sep. 15, 2021

(65) Prior Publication Data

US 2022/0078608 A1     Mar. 10, 2022

Related U.S. Application Data

(63) Continuation of application No. 15/990,156, filed on May 25, 2018, now Pat. No. 11,129,017.

(Continued)

(51) Int. Cl.
*H04W 12/04* (2021.01)
*H04W 76/10* (2018.01)
(Continued)

(52) U.S. Cl.
CPC ......... *H04W 12/04* (2013.01); *H04W 12/041* (2021.01); *H04W 76/10* (2018.02); *H04W 88/08* (2013.01)

(58) Field of Classification Search
CPC . H04W 12/04; H04W 76/10; H04W 12/0401; H04W 88/08
(Continued)

(56) References Cited

U.S. PATENT DOCUMENTS 9,961,542 B2 *   5/2018   Rajadurai ........... H04W 12/033
10,798,579 B2 *  10/2020  Li ......................... H04W 12/03
(Continued)

FOREIGN PATENT DOCUMENTS

CN       1585327 A     2/2005
CN      102098676 A    6/2011
(Continued)

OTHER PUBLICATIONS

Chen-Guang He; An Enhanced Role-Based Access Control Mechanism for Hospital Information Systems; IEEE:2011; pp. 1001-1005.*

(Continued)

*Primary Examiner* — Monjur Rahim
(74) *Attorney, Agent, or Firm* — Slater Matsil, LLP (57) ABSTRACT

A method for operating a user equipment (UE) includes deriving security keys for a signaling radio bearer (SRB) in accordance with a first message received from an access node, initiating security for the SRB in accordance with the first message, receiving, from the access node, a second message including at least one security parameter for at least one data radio bearer (DRB), wherein the at least one security parameter is associated with a session that includes the at least one DRB, and wherein the second message is secured with the security keys for the SRB, and initiating security for the at least one DRB in accordance with the at least one security parameter.

20 Claims, 6 Drawing Sheets

Related U.S. Application Data (60) Provisional application No. 62/564,435, filed on Sep. 28, 2017.

(51) Int. Cl.
  *H04W 76/20* (2018.01)
  *H04W 12/041* (2021.01)
  *H04W 88/08* (2009.01)

(58) Field of Classification Search
  USPC .............................................................. 726/3
  See application file for complete search history.

(56) References Cited

U.S. PATENT DOCUMENTS

| | | | | |
|---|---|---|---|---|
| 2012/0315878 | A1* | 12/2012 | Deng | H04W 76/19 455/411 |
| 2013/0236016 | A1* | 9/2013 | Zhang | H04W 12/033 380/270 |
| 2015/0043492 | A1* | 2/2015 | Baek | H04W 76/15 370/329 |
| 2015/0092942 | A1* | 4/2015 | Wager | H04L 63/061 380/270 |
| 2015/0215826 | A1* | 7/2015 | Yamada | H04W 36/0072 455/436 |
| 2017/0245318 | A1* | 8/2017 | Rayavarapu | H04W 68/005 |
| 2017/0311290 | A1* | 10/2017 | Adjakple | H04W 76/18 |
| 2018/0041930 | A1* | 2/2018 | Hampel | H04W 76/11 |
| 2018/0199240 | A1* | 7/2018 | Dao | H04L 67/142 |
| 2018/0227752 | A1* | 8/2018 | Teyeb | H04W 16/14 |
| 2019/0007921 | A1* | 1/2019 | Schliwa-Bertling | H04W 76/10 |

FOREIGN PATENT DOCUMENTS

| | | |
|---|---|---|
| CN | 102448058 A | 5/2012 |
| CN | 102487507 A | 6/2012 |
| CN | 103314548 A | 9/2013 |
| CN | 104956644 A | 9/2015 |

OTHER PUBLICATIONS

3rd Generation Partnership Project; Technical Specification Group Services and System Aspects; Study on the security aspects of the next generation system (Release 14), 3GPP TR 33.899, Jun. 2017, 586 pages, V1.2.0.

"3rd Generation Partnership Project; Technical Specification Group Services and System Aspects; General Packet Radio Service (GPRS) enhancements for Evolved Universal Terrestrial Radio Access Network (E-UTRAN) access (Release 14)," 3GPP TS 23.401 V14.4.0, Jun. 2017, 386 pages.

"3rd Generation Partnsership Project; Technical Specification Group Services and System Aspects; System Architecture for the 5G System; Stage 2 (Release 15)," 3GPP TS 23.501 V15.1.0, Mar. 2018, 201 pages.

"3rd Generation Partnership Project; Technical Specifcation Group Services and System Aspects; 3GPP System Architecture Evolution (SAE) Security Architecture Evolution (SAE); Security architecture (Release 14)," 3GPP TS 33.401 V14.0.0, Sep. 2016, 152 pages.

"3rd Generations Partnership Project; Technical Specification Group Services and System Aspects; 3GPP System Architecture Evolution (SAE); Security architecture (Release 14)," 3GPP TS 33.401, V14. 3.0, Jun. 2017, 153 pages.

"3rd Generation Partnership Project; Technical Specification Group Services and System Aspects, Security Architecture and Procedures for 5G System (Release 15)," 3GPP TS 33.501 V0.3.0, Aug. 2017, 44 pages.

"3rd Generation Partnership Project; Technical Specification Group Services and System Aspects; Study on the security of the next generation system (Release 14)," 3GPP TR 33.899 V1.3.0, Aug. 2017, 605 pages.

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.3.0, Jun. 2017, 745 pages.

"3rd Generation Partnership Project; Technical Specification Group Radio Access Network; Evolved Universal Terrestrial Radio Access (E-UTRA); Radio Resource Control (RCC); Protocol specification (Release 14)," 3GPP TS 36.331 V14.5.1, Jan. 2018, 764 pages.

MCC Support, "Draft Report of 3GPP TSG RAN WG1 #89 v0.2.0," 3GPP TSG RAN WG1 Meeting #90, Prague, Czech Rep, Aug. 21-25, 2017, 166 pages.

Alam, M., et al., "Secure Device-to-Device Communication in LTE-A", Smart-Device-To-Smart-Device Communications, IEEE Communications Magazine, Apr. 2014, 8 Pages.

Liu, G., et al., "Multi-granularity Time-constraint Role-bases Access Control", Proceedings of 2008 IEEE International Symposium on IT in Medicine and Education, 4 Pages.

MCC Support, "Final Report of 3GPP TSG RAN WG1 #90 v1.0.0," 3GPP TSG RAN WG1 Meeting #90bis, R1-1716941, Prague, Czech Rep., Oct. 9-13, 2017, 172 pages.

Huawei, et al., "Security procedure for SCG RRC message via MCG SRB and SCG SRB," 3GPP TSG RAN WG2 Meeting #98, R2-1705146, Agenda Item 10.2.5, Hangzhou, China, May 15-19, 2017, 3 pages.

\* cited by examiner

SYSTEM AND METHOD FOR SECURITY ACTIVATION WITH SESSION GRANULARITY

This application is a continuation of U.S. patent application Ser. No. 15/990,156, filed on May 25, 2018, entitled "System and Method for Security Activation with Session Granularity," which claims the benefit of U.S. Provisional Application No. 62/564,435, filed on Sep. 28, 2017, entitled "System and Method for Security Activation with Session Granularity," which applications are hereby incorporated herein by reference in their entireties.

TECHNICAL FIELD

The present disclosure relates generally to a system and method for digital communications, and, in particular embodiments, to a system and method for security activation with session granularity.

BACKGROUND

Security in wireless communications systems is an important consideration. End-to-end security provides protection for information exchanged between communications devices, as well as protection for the users of these communications devices. Security in wireless communications systems may involve user or device authentication, data integrity, user or data confidentiality, access control, billing, and so on. Heretofore, security has been provided in a one-shot basis, with all sessions associated with a single device having the same security settings.

However, at a single device, some sessions may not require the highest levels of security, while other sessions may find that the security settings associated with the device are insufficient. Therefore, there is a need for session granularity security activations.

SUMMARY

Example embodiments provide a system and method for security activation with session granularity.

In accordance with an example embodiment, a computer implemented method for operating a user equipment (UE) is provided. The method includes deriving, by the UE, security keys for a signaling radio bearer (SRB) in accordance with a first message received from an access node, initiating, by the UE, security for the SRB in accordance with the first message, receiving, by the UE from the access node, a second message including at least one security parameter for at least one data radio bearer (DRB), wherein the at least one security parameter is associated with a session that includes the at least one DRB, and wherein the second message is secured with the security keys for the SRB, and initiating, by the UE, security for the at least one DRB in accordance with the at least one security parameter.

Optionally, in any of the preceding embodiments, an embodiment further includes receiving, by the UE from the access node, a third message associated with at least one additional DRB, the third message including the at least one security parameter, and wherein the third message is secured with the security keys for the SRB, and initiating, by the UE, security for the at least one additional DRB in accordance with the at least one security parameter.

Optionally, in any of the preceding embodiments, an embodiment wherein a first key used for securing the at least one DRB and a second key used for securing the at least one additional DRB are the same.

Optionally, in any of the preceding embodiments, an embodiment wherein a first key used for securing the at least one DRB and a second key used for securing the at least one additional DRB are different.

Optionally, in any of the preceding embodiments, an embodiment wherein the at least one security parameter comprises a session identifier.

Optionally, in any of the preceding embodiments, an embodiment wherein the at least one security parameter comprises one or more of an integrity indicator, a ciphering indicator, one or more radio bearer specific algorithms, or radio bearer specific key information.

Optionally, in any of the preceding embodiments, an embodiment wherein the first message comprises a SecurityModeCommand message.

Optionally, in any of the preceding embodiments, an embodiment wherein the second message comprises a radio resource control (RRC) reconfiguration message.

Optionally, in any of the preceding embodiments, an embodiment wherein the RRC reconfiguration message comprises a RRCConnectionReconfiguration message.

In accordance with an example embodiment, a computer implemented method for operating an access node is provided. The method includes receiving, by the access node from an access and mobility management function (AMF), a first message to initiate a session at a UE, the first message including at least one security parameter for at least one DRB associated with the session, sending, by the access node to the UE, a second message including the at least one security parameter for the at least one DRB associated with the session, and initiating, by the access node, security for the at least one DRB in accordance with the at least one security parameter.

Optionally, in any of the preceding embodiments, an embodiment further includes sending, by the access node to the UE, a third message including the at least one security parameter for at least one additional DRB, and initiating, by the access node, security for the at least one additional DRB in accordance with the at least one security parameter.

Optionally, in any of the preceding embodiments, an embodiment further includes receiving, by the access node from the AMF, a fourth message initiating a context setup, and sending, by the access node to the UE, a fifth message initiating security on the UE. Optionally, in any of the preceding embodiments, an embodiment wherein the fifth message comprises a SecurityModeCommand message.

Optionally, in any of the preceding embodiments, an embodiment wherein the fourth message comprises an initial context setup request message.

Optionally, in any of the preceding embodiments, an embodiment wherein the first message comprises a PDU session setup message.

Optionally, in any of the preceding embodiments, an embodiment wherein the second message comprises a RRC reconfiguration message.

Optionally, in any of the preceding embodiments, an embodiment wherein the RRC reconfiguration message comprises a RRCConnectionReconfiguration message.

In accordance with an example embodiment, a UE is provided. The UE includes a memory storage comprising instructions, and one or more processors in communication with the memory storage. The one or more processors execute the instructions to derive security keys for a SRB in accordance with a first message received from an access node, initiate security for the SRB in accordance with the first message, receive, from the access node, a second message including at least one security parameter for at least one DRB, wherein the at least one security parameter is associated with a session that includes the at least one DRB, and wherein the second message is secured with the security keys for the SRB, and initiate security for the at least one DRB in accordance with the at least one security parameter.

Optionally, in any of the preceding embodiments, an embodiment wherein the one or more processors further execute the instructions to receive, from the access node, a third message associated with at least one additional DRB, the third message including the at least one security parameter, and wherein the third message is secured with the security keys for the SRB, and initiate security for the at least one additional DRB in accordance with the at least one security parameter.

Optionally, in any of the preceding embodiments, an embodiment wherein a first key used for securing the at least one DRB and a second key used for securing the at least one additional DRB are the same.

Optionally, in any of the preceding embodiments, an embodiment wherein a first key used for securing the at least one DRB and a second key used for securing the at least one additional DRB are different.

In accordance with an example embodiment, an access node is provided. The access node includes a memory storage comprising instructions, and one or more processors in communication with the memory storage. The one or more processors execute the instructions to receive, from an AMF, a first message to initiate a session at a UE, the first message including at least one security parameter for at least one DRB associated with the session, send, to the UE, a second message including the at least one security parameter for the at least one DRB associated with the session, and initiate security for the at least one DRB in accordance with the at least one security parameter.

Optionally, in any of the preceding embodiments, an embodiment wherein the one or more processors further execute the instructions to send, to the UE, a third message including the at least one security parameter for at least one additional DRB, and initiate security for the at least one additional DRB in accordance with the at least one security parameter.

Optionally, in any of the preceding embodiments, an embodiment wherein the one or more processors further execute the instructions to receive, from the AMF, a fourth message initiating a context setup, and send, to the UE, a fifth message initiating security on the UE.

Practice of the foregoing embodiments enables the security settings to be configured on a session basis, thereby allowing for the tailoring of the security settings to meet the security requirements of a particular session. Not only does the configuration of the security settings based on the security requirements of the different sessions enables the meeting of each sessions' security requirements, the use of less stringent security settings for sessions that do not require high security levels helps to improve overall communications system performance by reducing processing time and overhead.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
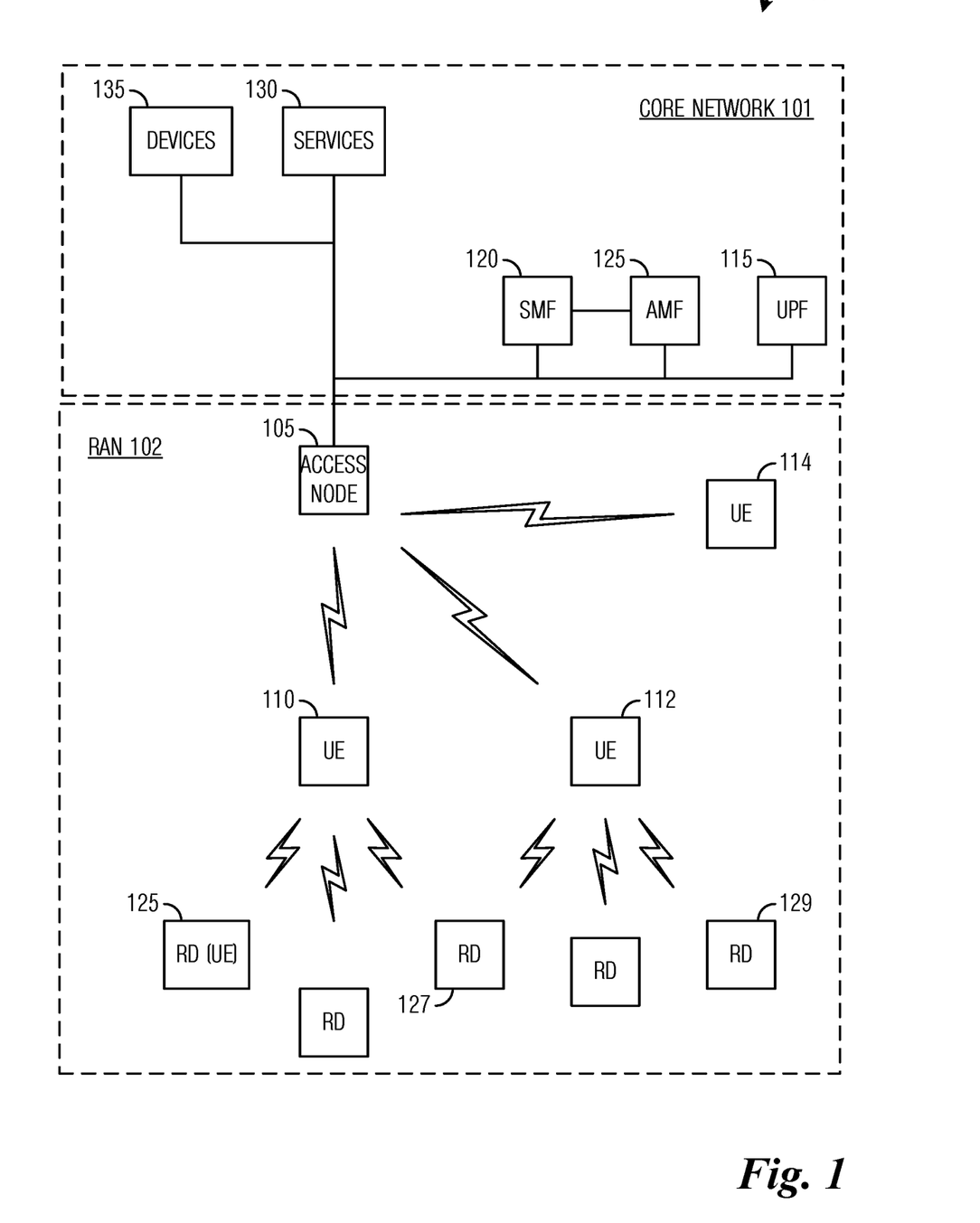
FIG. 1 illustrates an example wireless communications system that includes both a core network (CN) and a radio access network (RAN) according to example embodiments described herein.

FIG. 1 illustrates an example wireless communications system 100 that includes both a core network (CN) 101 and a radio access network (RAN) 102. RAN 102 includes an access node 105 serving a plurality of UEs, such as UE 110, UE 112, and UE 114. In a cellular operating mode, communications to and from the plurality of UEs go through access node 105, while in device to device communications mode, such as proximity services (ProSe) operating mode, for example, direct communication between UEs is possible. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, and so on, while UEs may also be commonly referred to as mobile stations, mobiles, terminals, users, subscribers, stations, and the like. Examples of UEs include cellular phones, wireless tablets, laptop computers, etc. A separate radio network controller (RNC) that does not have base station functionality is another example of a control node or network controller, but the access node may incorporate RNC functionality to reduce response times. Communications from an access node to a UE are commonly referred to as downlink communications, while communications from a UE to an access node are commonly referred to as uplink communications.

Core network 101 includes network entities such as a user plane function (UPF) 115 that provides entry and egress points for packets intended for users and an access and mobility management function (AMF) 125 that performs mobility management functions such as, for example, choosing the UPF for a UE, authenticating the UE, and checking its access permissions. Core network 101 also includes a session management function (SMF) 120, which performs session management functions such as, for example, establishing and releasing protocol data unit (PDU) sessions, enforcing policy on PDU sessions, and terminating session management signaling with the UE. It is noted that the definitions and terminology used in the discussion of FIG. 1 are from the Third Generation Partnership Project (3GPP) New Radio (NR) series of technical standards and they may differ for other types of communications systems. 3GPP NR is also commonly referred to as Fifth Generation (5G) NR. The names of the entities shown in core network 101 are exemplary and may vary in particular embodiments. For example, the network entities may be nodes that support a set of virtualized network functions. As another example, the network entities in a 3GPP Long Term Evolution (LTE) system may comprise a packet gateway (P-GW), a serving gateway (S-GW), a mobility management entity (MME), and the like. Therefore, the use of 3GPP NR terminology and definitions should not be construed as being limiting to the scope or the spirit of the example embodiments.

Wireless communications system 100 also includes a plurality of remote devices (RDs) within RAN 102, such as RD 127 and RD 129. The plurality of RDs includes a cellular handset functioning as a Remote UE 125, while the remaining RDs may include sensor devices, wearable devices, smart appliances, and so on. The term remote device (RD) may be used to refer to remote UEs, including remote devices that function as UEs but do not have the form factor or function of a conventional cellular handset (such as sensor devices, wearable devices, smart appliances, and so on). While it is understood that communications systems may employ multiple access nodes capable of communicating with a number of UEs, remote UEs, and other RDs, only one access node, one remote UE, a number of other UEs, and a number of other RDs are illustrated for simplicity.

As discussed previously, security in wireless communications systems provides protection for information exchanged between communications devices, as well as user or device authentication, data integrity, user or data confidentiality, access control, billing, and so forth. Therefore, security is an important consideration. However, existing security techniques have provided security on a one-shot basis (such as when the UE context is set up, for example), where all sessions associated with a single device have the same security settings. For example, a single procedure may activate security for all sessions or all bearers associated with the device, using a common set of security settings.

Figure 2:
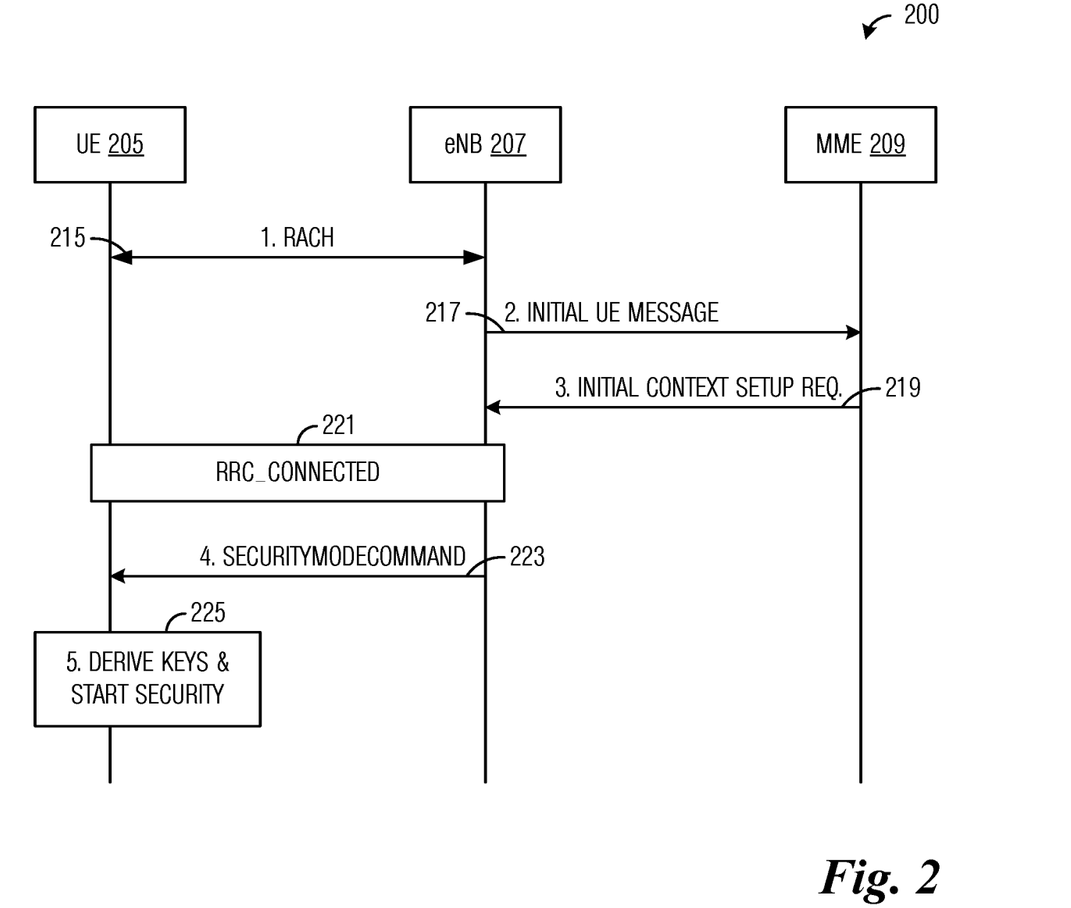
FIG. 2 illustrates a diagram of an interaction between communications devices in a communications system setting up security.

FIG. 2 illustrates a diagram 200 of an interaction between communications devices in a communications system setting up security. As shown in FIG. 2, the interaction occurs between a UE 205, an eNB 207, and a MME 209, while the communications devices participate in setting up security for UE 205. The communications made and the processing performed by the communications device shown in FIG. 2, as well as the terminology used in the description thereof, are compliant with the 3GPP LTE series of technical standards. Security set up procedures for other communications systems are similar.

UE 205, upon entering a coverage area of eNB 207 or powering on in the coverage area of eNB 207, initiates a random access procedure (by transmitting a preamble on a random access channel (RACH), for example) with eNB 207 (event 215). If eNB 207 does not already have a context for UE 205 (i.e., a UE context for UE 205), eNB 207 sends an initial UE message to MME 209 (event 217) and receives an initial context setup request from MME 209, which includes information needed to set up the UE context for UE 205 (event 219). UE 205 is now in a connected state, e.g., a radio resource control (RRC) connected state (RRC_CONNECTED), with eNB 207 (block 221). eNB 207 sends a SecurityModeCommand message to UE 205 (event 223) to activate security at UE 205. The SecurityModeCommand message activates security, e.g., ciphering or integrity checking, for UE 205 on a per UE basis, meaning that the same security settings is applied to all sessions of UE 205, independent of actual security needs of individual sessions. UE 205 derives security keys and starts security operations (block 225).

As discussed previously, the use of a single set of security settings may not adequately meet the needs of all sessions of a UE. As an illustrative example, watching a publicly accessible video typically does not require the same level of security as participating in on-line banking, on-line tax filing, or accessing medical records. Applying maximum security (as usually needed for on-line banking, on-line tax filing, or medical record access) to video consumption may lead to inefficient use of network resources (due to network resources being dedicated to providing the higher level of security), thereby leading to decreased communications system performance. A decision as to the required level of security may be made on a per-session basis, taking into account operator policy regarding the service(s) supported by each session, for example. Therefore, there is a need for systems and methods for security activation with at least session granularity.

Additionally, an objective for the 5G NR system architecture is to have security be on a per PDU session basis, with some security parameters, such as security keys, still potentially being on a per UE basis. Data integrity, at least, will be enabled or disabled on a per PDU session basis, and it is also considered to have data encryption enabled or disabled on a per PDU session basis. In general, when a PDU session is enabled, one or more radio bearers are configured. Furthermore, packet data convergence protocol (PDCP) entities for these radio bearers should reflect the PDU session security configuration.

The 3GPP LTE security procedure, as shown in FIG. 2, for example, does not manage security on a per session basis. The PDU session is not exposed to the UE Access Stratum (AS), which implies that it may not be possible to simply activate security for a specific PDU session because the UE AS layers have no concept of a particular PDU session. The introduction of the PDU session concept to the UE AS would be a violation of the layering concept. However, a signaling procedure that can achieve the security granularity is needed.

According to an example embodiment, systems and methods for security activations on a session basis are provided. According to an example embodiment, the network individually configures the security configuration of each radio bearer of a PDU session. The network may be responsible for ensuring that the radio bearers of the PDU session share a common security configuration by consistently configuring the security configuration of the radio bearers of the PDU session. As an illustrative example, a SecurityModeCommand message is sent during an initial UE context setup. The SecurityModeCommand message establishes security parameters on a per UE basis and starts security on signaling radio bearers (SRBs). Then, when a PDU session is set up, the network establishes new data radio bearers (DRBs) of the PDU session with RRCConnectionReconfiguration messages. The network specifies the security configuration of each new radio bearer of the PDU session in a corresponding PDCP configuration of each new radio bearer. Additional radio bearers may be added to the PDU session and the network specifies the security configuration of each additional radio bearer in its corresponding PDCP configuration. Therefore, the network ensures that each radio bearer of the PDU session has the same security settings by consistently configuring the individual security configurations of each of the radio bearers of the PDU session. In other words, the network applies the same security settings to each radio bearer of the PDU session when the individual radio bearers are set up, therefore, the radio bearers of the PDU session have the same security configuration.

Figure 3:
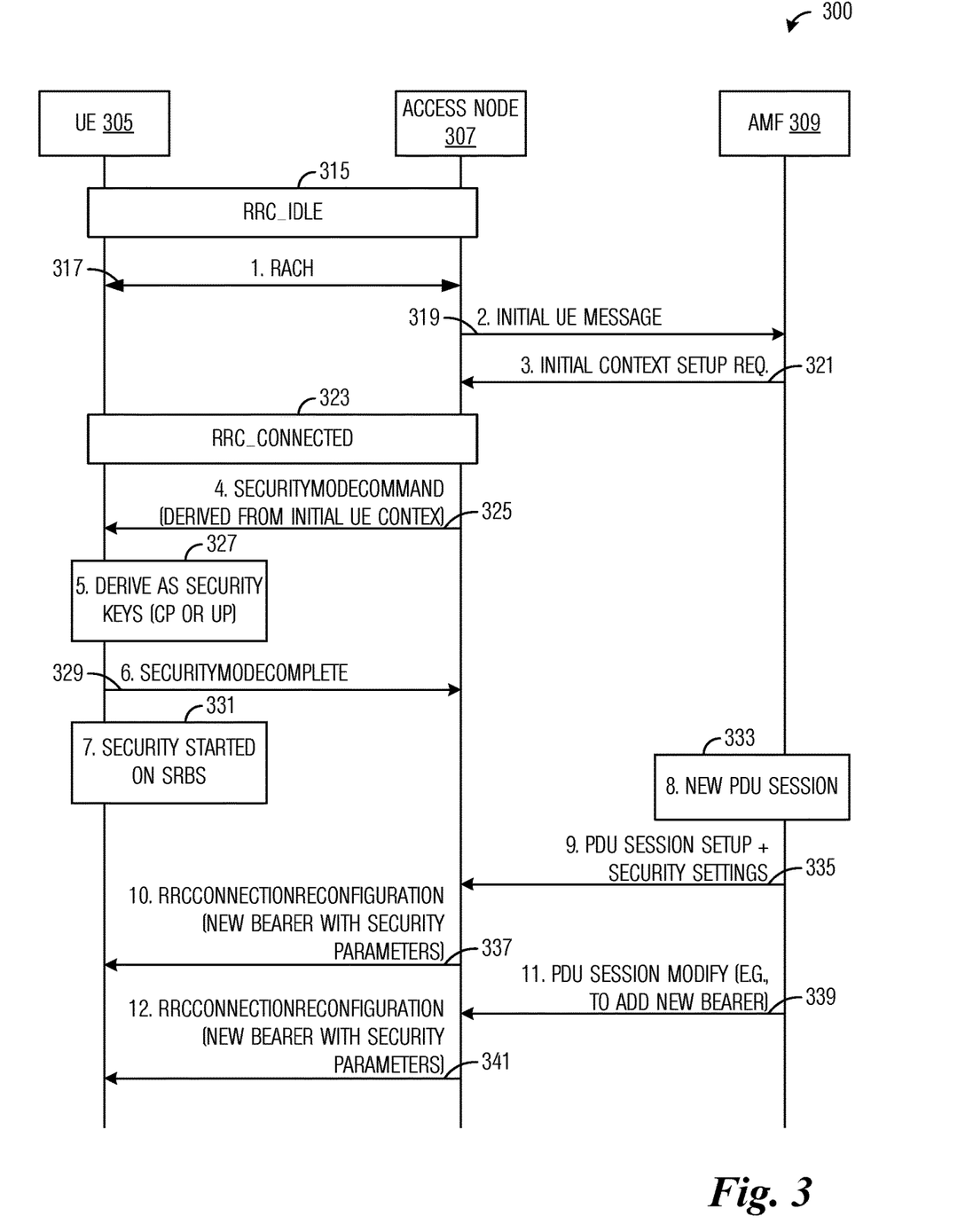
FIG. 3 illustrates a diagram of an interaction between communications devices in a communications system setting up security with session granularity according to example embodiments described herein.

FIG. 3 illustrates a diagram 300 of an interaction between communications devices in a communications system setting up security with session granularity. As shown in FIG. 3, interactions between a UE 305, an access node 307, and an access and mobility management function (AMF) 309, while the communications devices participate in setting up security for UE 305 with session granularity. The communications made and the processing performed by the communications devices shown in FIG. 3, as well as the terminology used in the description thereof, are compliant with 5G NR system architecture documents. However, the example embodiments presented herein are operable with other standards compliant and non-standards compliant communications systems. Therefore, the use of 5G NR terminology should not be construed as being limiting to either the scope or the spirit of the example embodiments.

UE 305, upon entering a coverage area of access node 307 or powering on in the coverage area of access node 307, is initially in an idle state, such as RRC_IDLE (block 315). UE 305 initiates a random access procedure (by transmitting a preamble on a RACH, for example) with access node 307 (event 317). If access node 307 does not already have a context for UE 305 (i.e., a UE context for UE 305), access node 307 sends an initial UE message to AMF 309 (event 319) and receives an initial context setup request from AMF 309, which includes information needed to set up the UE context for UE 305 (event 321). UE 305 is now in a connected state, e.g., RRC_CONNECTED, with access node 307 (block 323).

At this stage, UE 305 only has a first SRB (i.e., SRB1) setup with no security activated. Security activation occurs with the SecurityModeCommand message. With UE 305 in the connected state, access node 307 sends a SecurityModeCommand message to trigger key derivation and starts security at SRBs associated with UE 305 (event 325). The SecurityModeCommand message includes information derived from the UE context. The information derived from the UE context includes at least security algorithms to be used on the SRBs. The SecurityModeCommand message may also comprise an instruction to derive the keys. According to an embodiment, the SecurityModeCommand message does not start security for DRBs. UE 307 derives security keys, such as control plane (CP) or user plane (UP) protection keys (block 327). UE 305 sends a SecurityModeComplete message to access node 307 to convey that security keys have been derived and security has been started on SRBs (event 329). With the sending of SecurityModeComplete message, UE 305 has started security on SRBs (block 331).

When a PDU session starts (block 333), one or more DRBs are started. The one or more DRBs have their own security parameters. However, AMF 309 ensures that security parameter consistency is maintained so that at least some of the security parameters of the DRBs of the PDU session are maintained consistently across all of the DRBs of the PDU session. AMF 309 sends a PDU session setup command with security parameters to access node 307 (event 335). The PDU session setup command may include security parameters for the one or more DRBs. The security parameters for the one or more DRBs are forwarded to UE 305 in a RRC message. Access node 307 sends a connection configuration message, such as a RRCConnectionReconfiguration message, to UE 305 (event 337). The connection configuration message may include security parameters for the one or more DRBs. The security parameters may include integrity on or off (e.g., an integrity indicator, information, or flag), ciphering on or off (e.g., a ciphering indicator, information, or flag), PDU session specific or radio bearer specific algorithms, PDU session specific or radio bearer specific key information, and so forth. In some embodiments, certain security parameters may vary between DRBs of the same PDU session, while other security parameters are maintained consistently across all of the DRBs of the PDU session. For example, all DRBs of the PDU session may use the same algorithms and have the same settings for integrity on or off and ciphering on or off, but different DRBs of the PDU session may be configured to use different (e.g., bearer specific) keys.

If one or more DRBs are to be added to the PDU session, the one or more additional DRBs have their own security parameters, however, AMF 309 ensures that security parameter consistency is maintained so that at least some of the security parameters of the DRBs of the PDU session are maintained consistently across all of the DRBs of the PDU session. For example, all DRBs of the PDU session may use the same algorithms and have the same settings for integrity on or off and ciphering on or off. AMF 309 sends a PDU session modify command with security parameters to access node 307 (event 339). The PDU session setup command may include security parameters for the one or more additional DRBs. The security parameters for the one or more additional DRBs are forwarded to UE 305 in a RRC message. Access node 307 sends a connection configuration message, such as a RRCConnectionReconfiguration message, to UE 305 (event 341). The connection configuration message may include security parameters for the one or more DRBs. The security parameters may include integrity on or off (e.g., an integrity indicator, information, or flag), ciphering on or off (e.g., a ciphering indicator, information, or flag), radio bearer specific algorithms, bearer specific key information, and so forth. In some embodiments, certain security parameters may vary between DRBs of the same PDU session, while other security parameters are maintained consistently across all of the DRBs of the PDU session. For example, all DRBs of the PDU session may use the same algorithms and have the same settings for integrity on or off and ciphering on or off, but different DRBs of the PDU session may be configured to use different (e.g., bearer specific) keys.

It is noted that many security parameters, if they are configured on a per PDU session basis, remain the same for each radio bearer of the PDU session. However, some security parameters, such as security keys, should not be shared over the air for security reasons. Such parameters would not be expected to be configured explicitly in the over-the-air signaling, e.g., they would typically not be enumerated in the configuration fields describing a DRB. According to an example embodiment, information, such as a PDU session identifier, is provided to the UE in order to protect secure information. The information may be included in the bearer configuration sent to the UE. It is noted that it is not necessary to have a new PDU session start instruction to send to the UE. Only the information, which is associated with the radio bearer needs to be sent to the UE. As an illustrative example, when the UE sees a bearer configuration with new information (such as a new PDU session identifier), for which it hasn't already generated a security key, the UE generates a new security key and starts using the new security key for that particular radio bearer (the bearer associated with the new PDLU session identifier). In other words, the PDU session-specific information, such as the PDU session identifier, is used as a key index by the UE.

Figure 4:
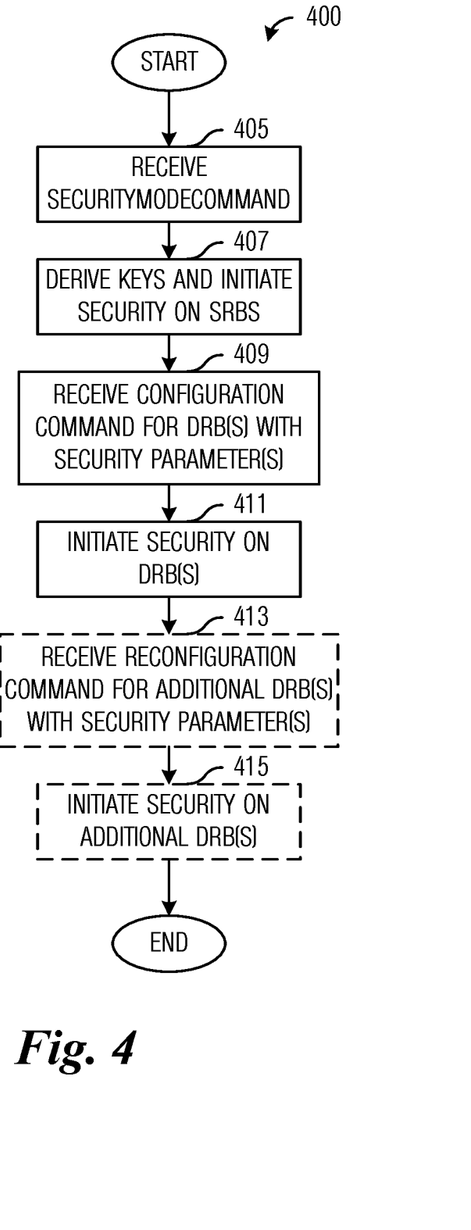
FIG. 4 illustrates a flow diagram of example operations occurring in a UE participating in security activation with session granularity according to example embodiments described herein.

FIG. 4 illustrates a flow diagram of example operations 400 occurring in a UE participating in security activation with session granularity. Operations 400 may be indicative of operations occurring in a UE as the UE participates in security activation with session granularity.

Operations 400 begin with the UE in a connected state (such as RRC_CONNECTED) and having a first SRB (i.e., SRB1) setup, but with no security activation. The UE receives a SecurityModeCommand message from an access node (block 405). The UE derives security keys and initiates security on SRBs (block 407). The SecurityModeCommand message triggers key derivation and initiates security on SRBs associated with the UE, for example. The SecurityModeCommand message includes information derived from the UE context of the UE. The information derived from the UE context includes at least security algorithms to be used on the SRBs. The SecurityModeCommand message may also comprise an instruction to derive the keys. The UE receives a configuration command, such as a connection configuration message (e.g., a RRCConnectionReconfiguration message) from the access node (block 409). The connection configuration message starts one or more DRBs associated with a PDU session at the UE. The connection configuration message may include security parameters for the one or more DRBs associated with the PDU session. The connection configuration message may be secured by a key associated with one or more SRBs. The UE initiates security on the one or more DRBs in accordance with the security parameters (block 411). In a situation where one or more additional DRBs are added to the PDU session, the UE may receive an additional connection configuration message (such as a RRCConnectionReconfiguration message) from the access node (block 413). The additional connection configuration message starts one or more additional DRBs associated with the PDU session at the UE. The additional connection configuration message may include security parameters for the one or more additional DRBs, where at least some of the security parameters included with the additional connection configuration message are the same as the corresponding security parameters included with the connection configuration message received in block 409. The UE may initiate security on the one or more additional DRBs in accordance with the security parameters (block 415).

Additionally, the UE may receive a further configuration command, such as a connection configuration message (e.g., a RRCConnectionReconfiguration message) from the access node, with the further connection configuration message starts one or more DRBs associated with a further PDU session at the UE. The further connection configuration message may include further security parameters for the one or more DRBs associated with the further PDU session. The further connection configuration message may be secured by a key associated with one or more SRBs. The UE initiates security on the one or more DRBs associated with the further PDU session in accordance with the security parameters provided in the further connection configuration message. In other words, the UE initiates separate security for different PDU sessions.

Figure 5:
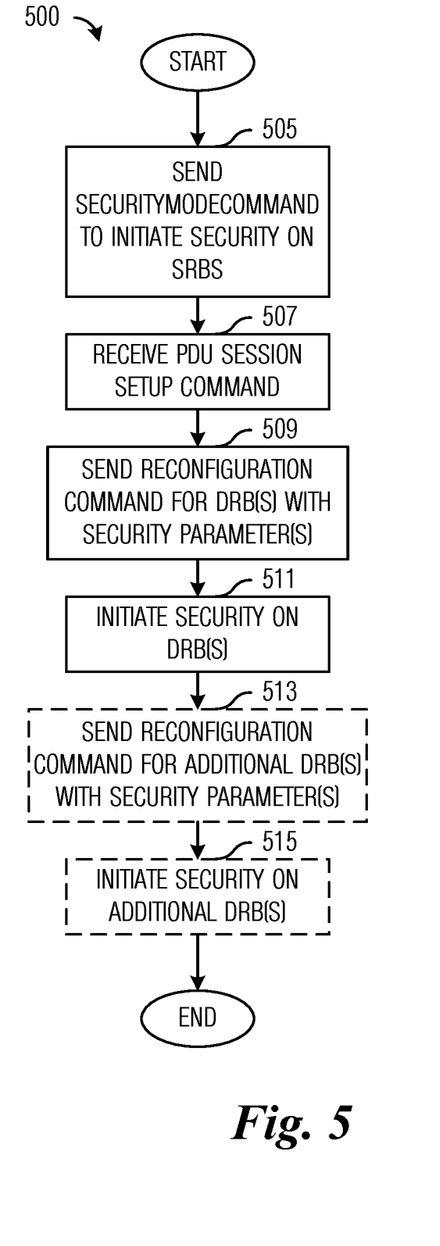
FIG. 5 illustrates a flow diagram of example operations occurring in an access node participating in security activation with session granularity according to example embodiments described herein.

FIG. 5 illustrates a flow diagram of example operations 500 occurring in an access node participating in security activation with session granularity. Operations 500 may be indicative of operations occurring in an access node as the access node participates in security activation with session granularity.

Operations 500 begin with the access node sending a SecurityModeCommand message to a UE (block 505). The SecurityModeCommand message triggers key derivation and initiates security on SRBs associated with the UE. The SecurityModeCommand message includes information derived from the UE context of the UE. The information derived from the UE context includes at least security algorithms to be used on the SRBs. The SecurityModeCommand message may also comprise an instruction to derive the keys. The access node receives a PDU session setup command from the network (block 507). The PDU session setup command may be received from an AMF, for example. The PDU session setup command includes security parameters for one or more DRBs associated with the PDU session. The access node sends a connection configuration message (such as a RRCConnectionReconfiguration message) to the UE (block 509). The connection configuration message starts one or more DRBs associated with a PDU session at the UE. The connection configuration message may include security parameters for the one or more DRBs. The access node participates in initiating security on the one or more DRBs (block 511). In a situation where one or more additional DRBs are added to the PDU session, the access node may send an additional connection configuration message (such as a RRCConnectionReconfiguration message) to the UE (block 513). The additional connection configuration message starts one or more additional DRBs associated with the PDU session at the UE. The additional connection configuration message may include security parameters for the one or more additional DRBs, where at least some of the security parameters included with the additional connection configuration message are the same as the corresponding security parameters included with the connection configuration message sent in block 509. The access node participates in initiating security on the one or more additional DRBs (block 515).

Additionally, the access node may receive a further PDU session setup command from the network, where the further PDU session setup command includes security parameters for one or more DRBs associated with the further PDU session. The access node may send a further connection configuration message (such as a RRCConnectionReconfiguration message) to the UE. The further connection configuration message starts one or more DRBs associated with a further PDU session at the UE. The connection configuration message may include security parameters for the one or more DRBs.

Figure 6:
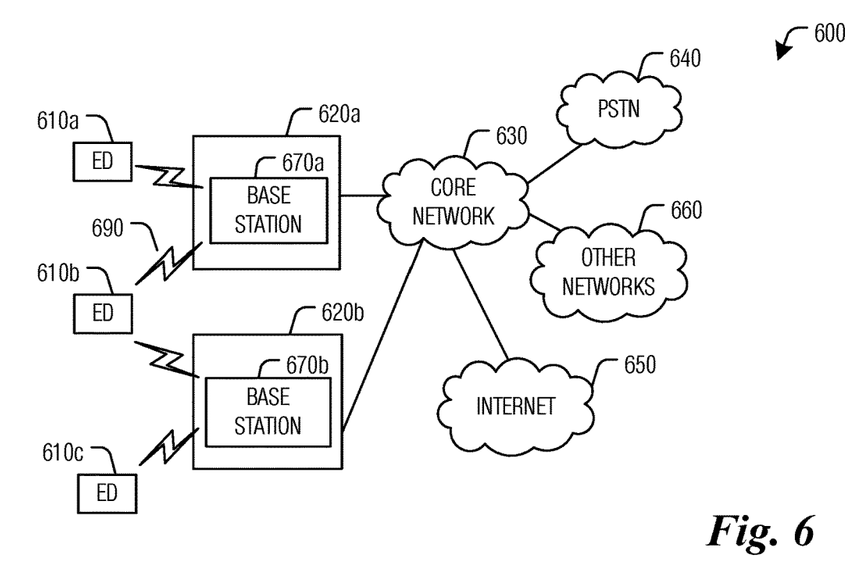
FIG. 6 illustrates an example communication system according to example embodiments described herein.

FIG. 6 illustrates an example communication system 600. In general, the system 600 enables multiple wireless or wired users to transmit and receive data and other content. The system 600 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 600 includes electronic devices (ED) 610a-610c, radio access networks (RANs) 620a-620b, a core network 630, a public switched telephone network (PSTN) 640, the Internet 650, and other networks 660. While certain numbers of these components or elements are shown in FIG. 6, any number of these components or elements may be included in the system 600.

The EDs 610a-610c are configured to operate or communicate in the system 600. For example, the EDs 610a-610c are configured to transmit or receive via wireless or wired communication channels. Each ED 610a-610c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 620a-620b here include base stations 670a-670b, respectively. Each base station 670a-670b is configured to wirelessly interface with one or more of the EDs 610a-610c to enable access by the EDs to the core network 630, the PSTN 640, the Internet 650, or the other networks 660. For example, the base stations 670a-670b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 610a-610c are configured to interface and communicate with the Internet 650 and may access the core network 630, the PSTN 640, or the other networks 660.

In the embodiment shown in FIG. 6, the base station 670a forms part of the RAN 620a, which may include other base stations, elements, or devices. Also, the base station 670b forms part of the RAN 620b, which may include other base stations, elements, or devices. Each base station 670a-670b operates to transmit or receive wireless signals within a particular geographic region or area, sometimes referred to as a "cell." In some embodiments, multiple-input multiple-output (MIMO) technology may be employed having multiple transceivers for each cell.

The base stations 670a-670b communicate with one or more of the EDs 610a-610c over one or more air interfaces 690 using wireless communication links. The air interfaces 690 may utilize any suitable radio access technology.

It is contemplated that the system 600 may use multiple channel access functionality, including such schemes as described above. In particular embodiments, the base stations and EDs implement NR, LTE, LTE-A, or LTE-B. Of course, other multiple access schemes and wireless protocols may be utilized.

The RANs 620a-620b are in communication with the core network 630 to provide the EDs 610a-610c with voice, data, application, Voice over Internet Protocol (VoIP), or other services. Understandably, the RANs 620a-620b or the core network 630 may be in direct or indirect communication with one or more other RANs (not shown). The core network 630 may also serve as a gateway access for other networks (such as the PSTN 640, the Internet 650, and the other networks 660). In addition, some or all of the EDs 610a-610c may include functionality for communicating with different wireless networks over different wireless links using different wireless technologies or protocols. Instead of wireless communication (or in addition thereto), the EDs may communicate via wired communication channels to a service provider or switch (not shown), and to the Internet 650.

Although FIG. 6 illustrates one example of a communication system, various changes may be made to FIG. 6. For example, the communication system 600 could include any number of EDs, base stations, networks, or other components in any suitable configuration.

Figure 7A:
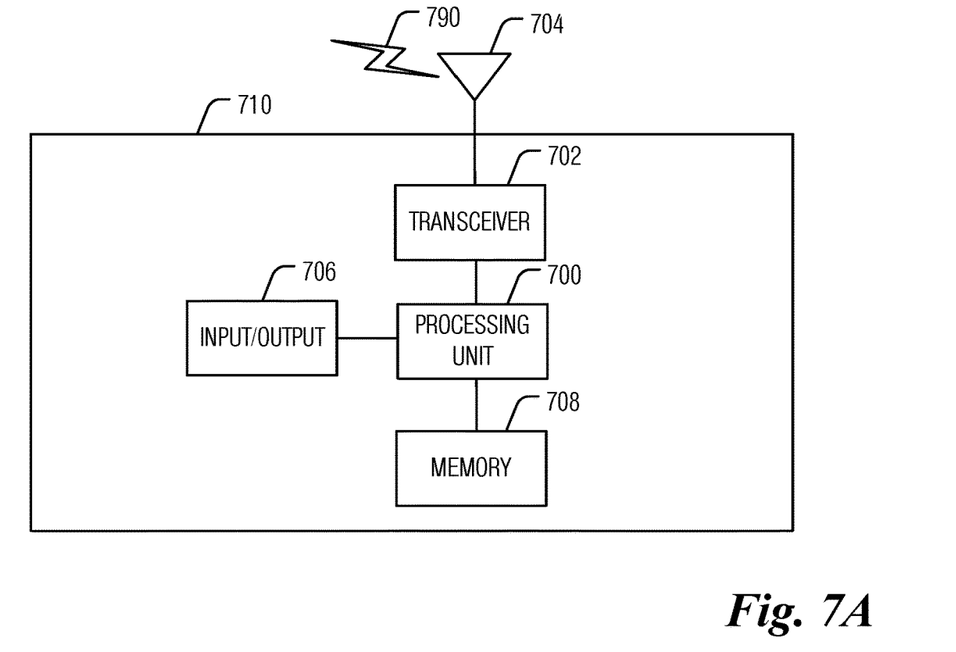
FIGS. 7A and 7B illustrate example devices that may implement the methods and teachings according to this disclosure.
Figure 7B:
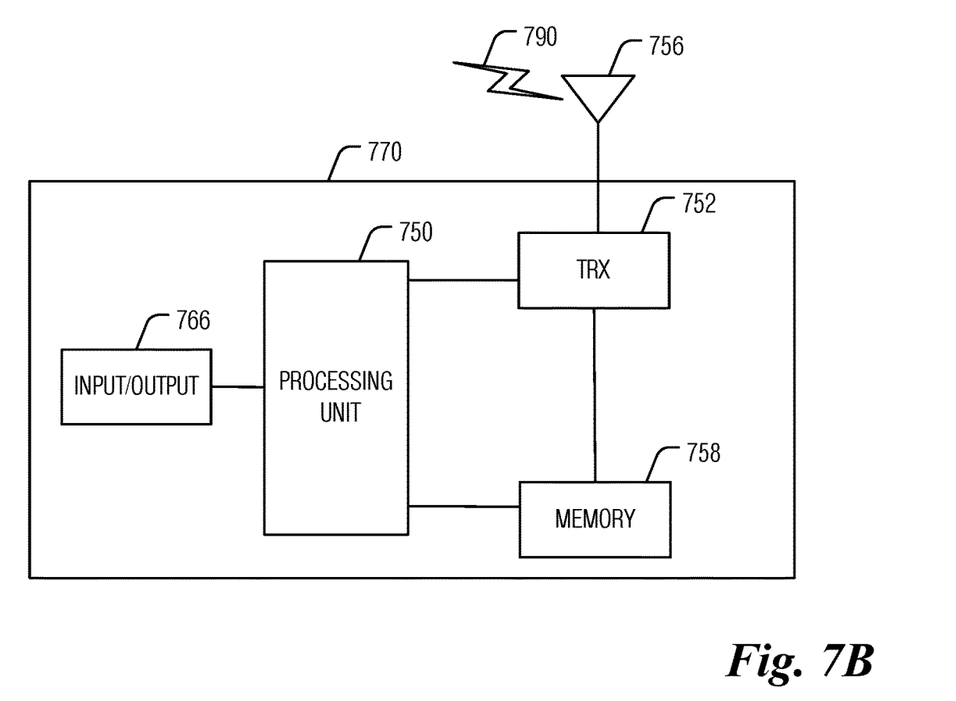

FIGS. 7A and 7B illustrate example devices that may implement the methods and teachings according to this disclosure. In particular, FIG. 7A illustrates an example ED 710, and FIG. 7B illustrates an example base station 770. These components could be used in the system 600 or in any other suitable system.

As shown in FIG. 7A, the ED 710 includes at least one processing unit 700. The processing unit 700 implements various processing operations of the ED 710. For example, the processing unit 700 could perform signal coding, data processing, power control, input or output processing, or any other functionality enabling the ED 710 to operate in the system 600. The processing unit 700 also supports the methods and teachings described in more detail above. Each processing unit 700 includes any suitable processing or computing device configured to perform one or more operations. Each processing unit 700 could, for example, include a microprocessor, microcontroller, digital signal processor, field programmable gate array, or application specific integrated circuit.

The ED 710 also includes at least one transceiver 702. The transceiver 702 is configured to modulate data or other content for transmission by at least one antenna or NIC (Network Interface Controller) 704. The transceiver 702 is also configured to demodulate data or other content received by the at least one antenna 704. Each transceiver 702 includes any suitable structure for generating signals for wireless or wired transmission or processing signals received wirelessly or by wire. Each antenna 704 includes any suitable structure for transmitting or receiving wireless or wired signals. One or multiple transceivers 702 could be used in the ED 710, and one or multiple antennas 704 could be used in the ED 710. Although shown as a single functional unit, a transceiver 702 could also be implemented using at least one transmitter and at least one separate receiver.

The ED 710 further includes one or more input or output devices 706 or interfaces (such as a wired interface to the Internet 650). The input or output devices 706 facilitate interaction with a user or other devices (network communications) in the network. Each input or output device 706 includes any suitable structure for providing information to or receiving or providing information from a user, such as a speaker, microphone, keypad, keyboard, display, or touch screen, including network interface communications.

In addition, the ED 710 includes at least one memory 708. The memory 708 stores instructions and data used, generated, or collected by the ED 710. For example, the memory 708 could store software or firmware instructions executed by the processing unit(s) 700 and data used to reduce or eliminate interference in incoming signals. Each memory 708 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 7B, the base station 770 includes at least one processing unit 750, at least one transceiver 752, which includes functionality for a transmitter and a receiver, one or more antennas 756, at least one memory 758, and one or more input or output devices or interfaces 766. A scheduler, which would be understood by one skilled in the art, is coupled to the processing unit 750. The scheduler could be included within or operated separately from the base station 770. The processing unit 750 implements various processing operations of the base station 770, such as signal coding, data processing, power control, input or output processing, or any other functionality. The processing unit 750 can also support the methods and teachings described in more detail above. Each processing unit 750 includes any suitable processing or computing device configured to perform one or more operations. Each processing unit 750 could, for example, include a microprocessor, microcontroller, digital signal processor, field programmable gate array, or application specific integrated circuit.

Each transceiver 752 includes any suitable structure for generating signals for wireless or wired transmission to one or more EDs or other devices. Each transceiver 752 further includes any suitable structure for processing signals received wirelessly or by wire from one or more EDs or other devices. Although shown combined as a transceiver 752, a transmitter and a receiver could be separate components. Each antenna 756 includes any suitable structure for transmitting or receiving wireless or wired signals. While a common antenna 756 is shown here as being coupled to the transceiver 752, one or more antennas 756 could be coupled to the transceiver(s) 752, allowing separate antennas 756 to be coupled to the transmitter and the receiver if equipped as separate components. Each memory 758 includes any suitable volatile or non-volatile storage and retrieval device(s). Each input or output device 766 facilitates interaction with a user or other devices (network communications) in the network. Each input or output device 766 includes any suitable structure for providing information to or receiving or providing information from a user, including network interface communications.

Figure 8:
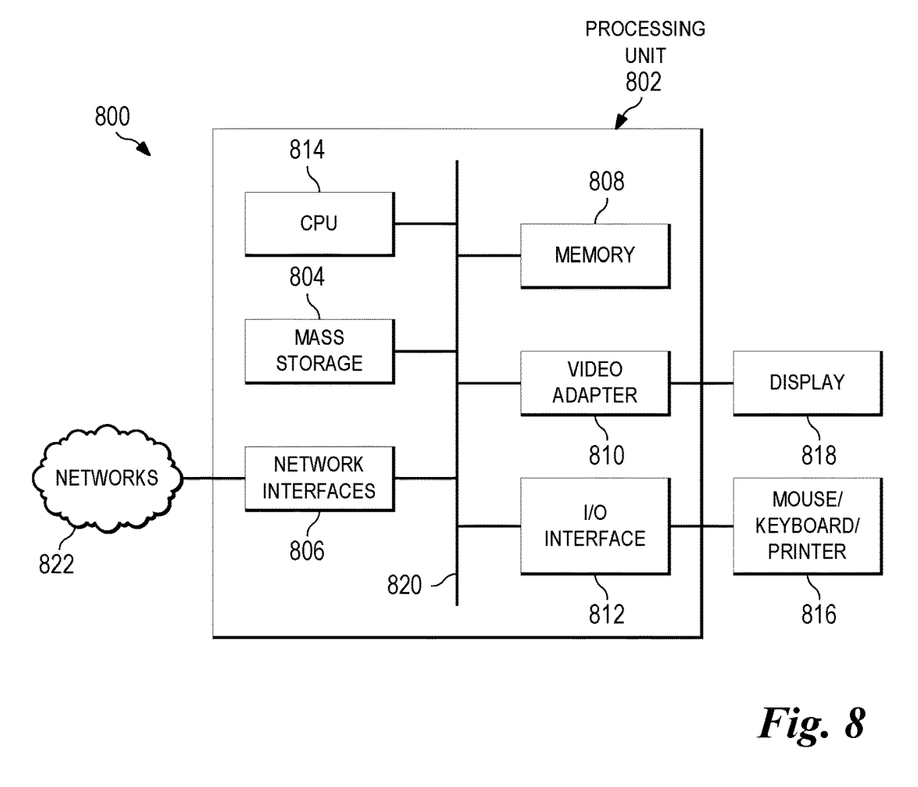
FIG. 8 is a block diagram of a computing system that may be used for implementing the devices and methods disclosed herein.

FIG. 8 is a block diagram of a computing system 800 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 800 includes a processing unit 802. The processing unit includes a central processing unit (CPU) 814, memory 808, and may further include a mass storage device 804, a video adapter 810, and an I/O interface 812 connected to a bus 820.

The bus 820 may be one or more of any type of several bus architectures including a memory bus or memory controller, a peripheral bus, or a video bus. The CPU 814 may comprise any type of electronic data processor. The memory 808 may comprise any type of non-transitory system memory such as static random access memory (SRAM), dynamic random access memory (DRAM), synchronous DRAM (SDRAM), read-only memory (ROM), or a combination thereof. In an embodiment, the memory 808 may include ROM for use at boot-up, and DRAM for program and data storage for use while executing programs.

The mass storage 804 may comprise any type of non-transitory storage device configured to store data, programs, and other information and to make the data, programs, and other information accessible via the bus 820. The mass storage 804 may comprise, for example, one or more of a solid state drive, hard disk drive, a magnetic disk drive, or an optical disk drive.

The video adapter 810 and the I/O interface 812 provide interfaces to couple external input and output devices to the processing unit 802. As illustrated, examples of input and output devices include a display 818 coupled to the video adapter 810 and a mouse, keyboard, or printer 816 coupled to the I/O interface 812. Other devices may be coupled to the processing unit 802, and additional or fewer interface cards may be utilized. For example, a serial interface such as Universal Serial Bus (USB) (not shown) may be used to provide an interface for an external device.

The processing unit 802 also includes one or more network interfaces 806, which may comprise wired links, such as an Ethernet cable, or wireless links to access nodes or different networks. The network interfaces 806 allow the processing unit 802 to communicate with remote units via the networks. For example, the network interfaces 806 may provide wireless communication via one or more transmitters or transmit antennas and one or more receivers or receive antennas. In an embodiment, the processing unit 802 is coupled to a local-area network 822 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a deriving unit or module, or an initiating unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

The invention claimed is:

1. A method comprising:
receiving, by a user equipment (UE) from an access node, a first message indicating a security algorithm for a signaling radio bearer (SRB) of a protocol data unit (PDU) session;
determining, by the UE, the security algorithm for the SRB of the PDU session;
receiving, by the UE from the access node and based on the security algorithm, a first radio resource control (RRC) connection reconfiguration message over the SRB of the PDU session, the first RRC connection reconfiguration message instructing the UE to add a first DRB to the PDU session and to activate integrity protection for the first DRB of the PDU session; and
transmitting or receiving, by the UE and based on the security algorithm, integrity-protected data over the first DRB of the PDU session after the receiving the first RRC connection reconfiguration message.

2. The method of claim 1, wherein the first message further indicates a ciphering algorithm, the receiving the first RRC connection reconfiguration message comprising:
   receiving, by the UE and further based on the ciphering algorithm for the PDU session, the first RRC connection reconfiguration message, wherein the first RRC connection reconfiguration message further instructs the UE to activate ciphering for the first DRB, and the transmitting or receiving comprising:
   transmitting or receiving, by the UE and further based on the ciphering algorithm, the integrity-protected data, wherein the integrity-protected data is further cipher protected.

3. The method of claim 1, wherein the PDU session is established before the receiving the first RRC connection reconfiguration message.

4. The method of claim 1, wherein the first RRC connection reconfiguration message includes an integrity indicator that instructs the UE to activate the integrity protection for the first DRB.

5. The method of claim 1, further comprising:
   receiving, by the UE from the access node, a second RRC connection reconfiguration message, the second RRC connection reconfiguration message instructing the UE to add a second DRB to the PDU session and to activate integrity protection for the second DRB; and
   transmitting or receiving, by the UE and based on the security algorithm, second integrity-protected data over the second DRB of the PDU session after the receiving the second RRC connection reconfiguration message.

6. A method comprising:
   transmitting, by an access node to a user equipment (UE), a first message indicating a security algorithm for a signaling radio bearer (SRB) of a protocol data unit (PDU) session for the UE to determine the security algorithm for the SRB of the PDU session;
   transmitting, by the access node to the UE and based on the security algorithm, a first radio resource control (RRC) connection reconfiguration message over the SRB of the PDU session, the first RRC connection reconfiguration message instructing the UE to add a first DRB to the PDU session and to activate integrity protection for the first DRB of the PDU session; and
   transmitting or receiving, by the access node and based on the security algorithm, integrity-protected data over the first DRB of the PDU session after the transmitting the first RRC connection reconfiguration message.

7. The method of claim 6, wherein the first message further indicates a ciphering algorithm for the PDU session, the transmitting the first RRC connection reconfiguration message comprising:
   transmitting, by the access node and further based on the ciphering algorithm, the first RRC connection reconfiguration message, wherein the first RRC connection reconfiguration message further instructs the UE to activate ciphering for the first DRB, and the transmitting or receiving comprising:
   transmitting or receiving, by the access node and further based on the ciphering algorithm, the integrity-protected data, wherein the integrity-protected data is further cipher protected.

8. The method of claim 6, wherein the PDU session is established before the transmitting the first RRC connection reconfiguration message.

9. The method of claim 6, wherein the first RRC connection reconfiguration message includes an integrity indicator that instructs the UE to activate the integrity protection for the first DRB.

10. The method of claim 6, further comprising:
    transmitting, by the access node to the UE, a second RRC connection reconfiguration message, the second RRC connection reconfiguration message instructing the UE to add a second DRB to the PDU session and to activate integrity protection for the second DRB; and
    transmitting or receiving, by the access node and based on the security algorithm, second integrity-protected data over the second DRB of the PDU session after the receiving the second RRC connection reconfiguration message.

11. A user equipment (UE) comprising:
    at least one processor
    a non-transitory memory associated for storing instructions, that when executed by the at least one processor, cause the UE to:
    receive, from an access node, a first message indicating a security algorithm for a signaling radio bearer (SRB) of a protocol data unit (PDU) session;
    determine the security algorithm for the SRB of the PDU session;
    receive, from the access node and based on the security algorithm, a first radio resource control (RRC) connection reconfiguration message over the SRB of the PDU session, the first RRC connection reconfiguration message instructing the UE to add a first DRB to the PDU session and to activate integrity protection for the first DRB of the PDU session; and
    transmit or receive, based on the security algorithm, integrity-protected data over the first DRB of the PDU session after receiving the first RRC connection reconfiguration message.

12. The UE of claim 11, wherein the first message further indicates a ciphering algorithm, the instructions that cause the UE to receive the first RRC connection reconfiguration message comprising instructions to cause the UE to:
    receive, further based on the ciphering algorithm for the PDU session, the first RRC connection reconfiguration message, wherein the first RRC connection reconfiguration message further instructs the UE to activate ciphering for the first DRB, and the instructions that cause the UE to transmit or receive the integrity-protected data comprising instructions to cause the UE to:
    transmit or receive, further based on the ciphering algorithm, the integrity-protected data, wherein the integrity-protected data is further cipher protected.

13. The UE of claim 11, wherein the PDU session is established before receiving the first RRC connection reconfiguration message.

14. The UE of claim 11, wherein the first RRC connection reconfiguration message includes an integrity indicator that instructs the UE to activate the integrity protection for the first DRB.

15. The UE of claim 11, wherein the instructions further cause the UE to:
    receive, from the access node, a second RRC connection reconfiguration message, the second RRC connection reconfiguration message instructing the UE to add a second DRB to the PDU session and to activate integrity protection for the second DRB; and
    transmit or receive, based on the security algorithm, second integrity-protected data over the second DRB of the PDU session after receiving the second RRC connection reconfiguration message.

16. An access node comprising:
   at least one processor
   a non-transitory memory associated for storing instructions, that when executed by the at least one processor, cause the access node to:
      transmit, to a user equipment (UE), a first message indicating a security algorithm for a signaling radio bearer (SRB) of a protocol data unit (PDU) session for the UE to determine the security algorithm for the SRB of the PDU session;
      transmit, to the UE and based on the security algorithm, a first radio resource control (RRC) connection reconfiguration message over the SRB of the PDU session, the first RRC connection reconfiguration message instructing the UE to add a first DRB to the PDU session and to activate integrity protection for the first DRB of the PDU session; and
      transmit or receive, based on the security algorithm, integrity-protected data over the first DRB of the PDU session after transmitting the first RRC connection reconfiguration message.

17. The access node of claim 16, wherein the first message further indicates a ciphering algorithm for the PDU session, the instructions that cause the access node to transmit the first RRC connection reconfiguration message comprising instructions to cause the access node to:
   transmit, further based on the ciphering algorithm, the first RRC connection reconfiguration message, wherein the first RRC connection reconfiguration message further instructs the UE to activate ciphering for the first DRB, and the instructions that cause the access node to transmit or receive the integrity-protected data comprising instructions to cause the access node to:
   transmit or receive, further based on the ciphering algorithm, the integrity-protected data, wherein the integrity-protected data is further cipher protected.

18. The access node of claim 16, wherein the PDU session is established before transmitting the first RRC connection reconfiguration message.

19. The access node of claim 16, wherein the first RRC connection reconfiguration message includes an integrity indicator that instructs the UE to activate the integrity protection for the first DRB.

20. The access node of claim 16, wherein the instructions further cause the access node to:
   transmit, to the UE, a second RRC connection reconfiguration message, the second RRC connection reconfiguration message instructing the UE to add a second DRB to the PDU session and to activate integrity protection for the second DRB; and
   transmit or receive, based on the security algorithm, second integrity-protected data over the second DRB of the PDU session after receiving the second RRC connection reconfiguration message.

* * * * *